(12) United States Patent
Krizan et al.

(10) Patent No.: US 12,614,935 B2
(45) Date of Patent: Apr. 28, 2026

(54) ELECTRIC MACHINE ROTOR

(71) Applicant: FORD GLOBAL TECHNOLOGIES, LLC, Dearborn, MI (US)

(72) Inventors: Jacob Krizan, Farmington Hills, MI (US); Matthew Schmitt, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 211 days.

(21) Appl. No.: 18/448,490

(22) Filed: Aug. 11, 2023

(65) Prior Publication Data

US 2025/0055332 A1     Feb. 13, 2025

(51) Int. Cl.
| | |
|---|---|
| *H02K 1/27* | (2022.01) |
| *H02K 1/276* | (2022.01) |
| *H02K 1/28* | (2006.01) |

(52) U.S. Cl.
CPC .............. *H02K 1/276* (2013.01); *H02K 1/28* (2013.01)

(58) Field of Classification Search
CPC ........ H02K 1/276; H02K 1/28; H02K 1/2766; H02K 15/03; H02K 2213/03
See application file for complete search history.

(56) References Cited

U.S. PATENT DOCUMENTS

| | | | | |
|---|---|---|---|---|
| 5,973,435 | A | * | 10/1999 | Irie ..................... H02K 21/044 310/263 |
| 8,896,175 | B2 | | 11/2014 | Cirani et al. |
| 11,142,208 | B2 | | 10/2021 | Janampally et al. |
| 11,152,825 | B2 | | 10/2021 | Leonardi et al. |
| 11,285,950 | B1 | | 3/2022 | Bolger et al. |
| 11,362,552 | B2 | | 6/2022 | Zhu et al. |
| 11,545,860 | B2 | | 1/2023 | Lahr et al. |
| 2018/0287439 | A1 | | 10/2018 | Degner et al. |
| 2020/0235642 | A1 | * | 7/2020 | Deng ..................... H02K 1/276 |
| 2022/0021254 | A1 | * | 1/2022 | Leonardi ............... H02K 1/276 |
| 2022/0080971 | A1 | | 3/2022 | Bolger et al. |
| 2022/0089154 | A1 | | 3/2022 | Bolger et al. |
| 2022/0097706 | A1 | | 3/2022 | Bolger et al. |
| 2022/0176827 | A1 | | 6/2022 | Otanez et al. |

FOREIGN PATENT DOCUMENTS

| | | |
|---|---|---|
| CN | 112087080 A | 12/2020 |
| WO | WO-2016131932 A1 * | 8/2016 ............... H02K 1/28 |

* cited by examiner

*Primary Examiner* — Thomas Truong
(74) *Attorney, Agent, or Firm* — David B Kelley; Brooks Kushman P.C.

(57) ABSTRACT

An electric machine rotor includes a core, magnets, and a resin. The core defines pockets. The core defines notches extending from outer ends of each pocket. The core defines cavities each extending between inner ends of and connecting two of the pockets. The magnets are disposed within each of the pockets. The resin is disposed within each pocket and each cavity. The resin encases each magnet and secures each magnet to at least one of the plates. The gaskets are each disposed along an outer end of each pocket. The gaskets are configured to retain the resin within the pockets and the cavities. The gaskets are also configured to isolate the resin from the notches.

20 Claims, 5 Drawing Sheets

ELECTRIC MACHINE ROTOR

TECHNICAL FIELD

The present disclosure relates to a rotor for a permanent magnet electric machine.

BACKGROUND

Electric machines typically employ a rotor and stator to produce torque. Electric current flows through the stator windings to produce a magnetic field. The magnetic field generated by the stator may cooperate with permanent magnets within the rotor to generate torque.

SUMMARY

An electric machine rotor includes a plurality of plates, magnets, couplers, a molding compound, and gaskets. The plates are stacked along an axis. Each of the plates define pairs of pockets. Each of the plates define notches extending from outer ends of each pocket to outer peripheries of the plates. Each of the plates define bridging cavities extending between and connecting inner ends of each pocket within each of the pairs of pockets. The magnets are disposed within each of the pockets. The couplers are disposed within each of the bridging cavities and secure outer portions of each plate to a base portion of each plate. Each outer portion of each plate is separated from the base portion of each plate by an opening collectively formed by one of the pair of pockets, two of the notches, and one of the bridging cavities. The molding compound is disposed within each pocket and each bridging cavity. The molding compound encases each magnet, encases each coupler, secures each magnet to at least one of the plates, and secures each coupler to at least one of the plates. The gaskets are each disposed along an outer end of each pocket. The gaskets are configured to retain the molding compound within the pockets and the bridging cavities. The gaskets are configured to isolate the molding compound from the notches.

An electric machine rotor includes a core, magnets, and a resin. The core defines pockets. The core defines notches extending from outer ends of each pocket. The core defines cavities each extending between inner ends of and connecting two of the pockets. The magnets are disposed within each of the pockets. The resin is disposed within each pocket and each cavity. The resin encases each magnet and secures each magnet to at least one of the plates. The gaskets are each disposed along an outer end of each pocket. The gaskets are configured to retain the resin within the pockets and the cavities. The gaskets are also configured to isolate the resin from the notches.

An electric machine rotor includes stacked plates, magnets, connectors, a resin, and gaskets. The stacked plates define pockets. The stacked plates define notches extending from outer ends of each pocket to outer peripheries of the plates. The stacked plates define linking cavities each extending between inner ends of and connecting two of the pockets. The magnets are disposed within each of the pockets. The connectors are disposed within each of the linking cavities and secure outer portions of the plates to base portions of the plates. The resin is disposed within each pocket and each cavity. The resin encases each magnet and connector. The resin secures each magnet and connector to at least one of the plates. The gaskets are each disposed between one of the pockets and one of the notches. The gaskets are configured to retain the resin within the pockets and the cavities. The gaskets are also configured to isolate the resin from the notches.

DETAILED DESCRIPTION

Figure 1:
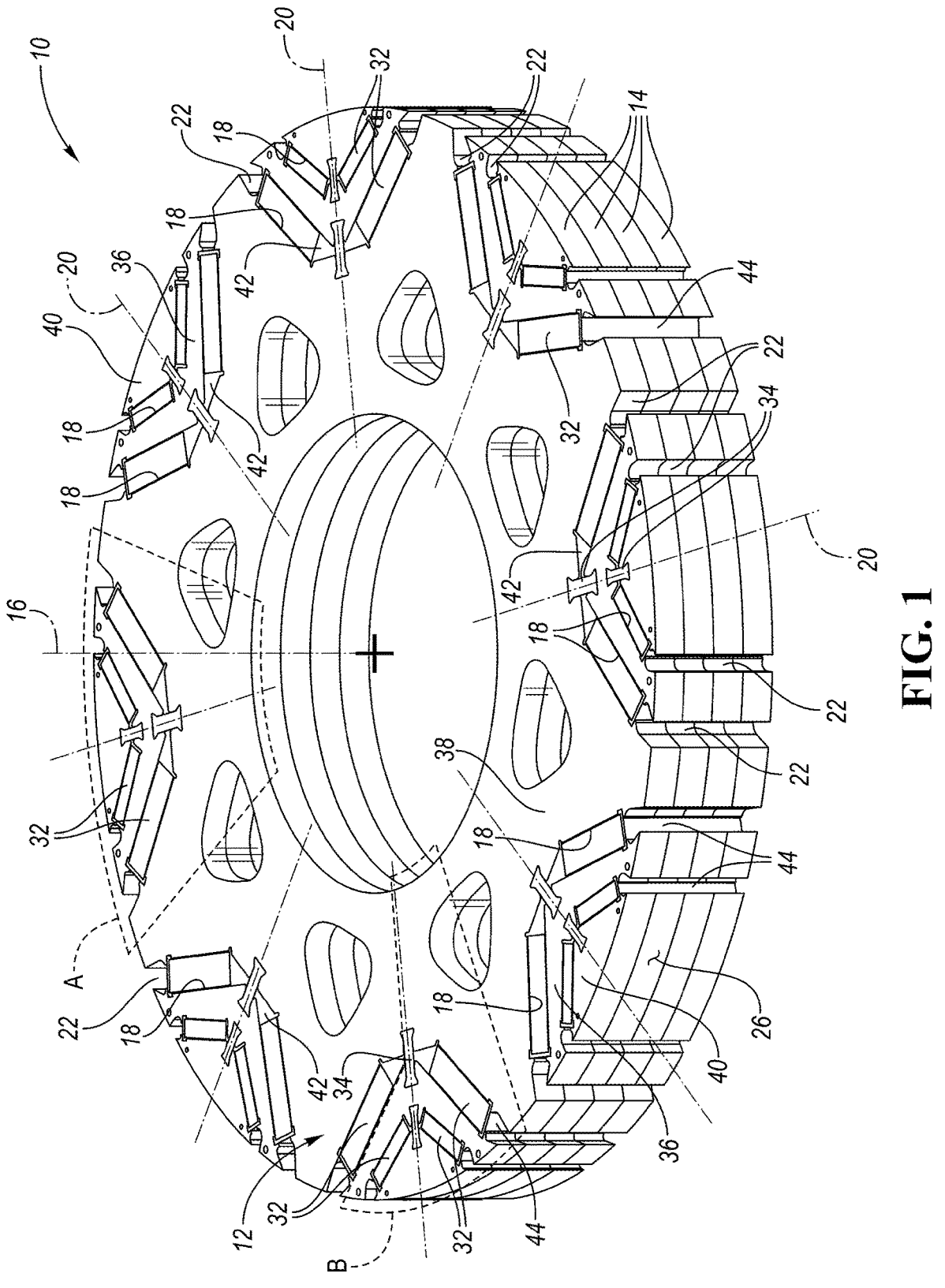
FIG. 1 is an isometric view of a rotor for an electric machine that is formed from a plurality of stacked laminated plates or laminations.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Permanent magnet electric machine rotors require the fixation of magnets in pockets cutout from laminated plates. The electric machines described herein may be motors, generators, or combination devices that may operate as both a motor and a generator. The retention of the magnets prevents a positional change during operation that would lead to imbalance in the rotor, variable electromagnetic performance, and potentially flung magnets. Glue, bent tabs, and molded epoxies, among other methods, all offer the ability to constrain the magnets in a desired position. However, molded resins or epoxies are prevalent due to their thermal and mechanical attributes that enhance the rotor system.

It is desirable to remove the bridges within the plates that bound the pockets in which the magnets are situated. The removal of such bridges reduces the low resistivity medium where which flux leakage around the magnets can occur, decreasing the losses and allowing for a reduction in magnet size for equivalent performance. The challenge in implementing the favorable molded epoxy fixation method (i.e., fixing the magnets to the laminated plates within the pockets via molded resins or epoxies) with such a bridgeless rotor stems from a lack of bounding features that allow for the molding compound to be injected and contained within the pockets. The current problem addressed herein is a system by which the epoxy can be molded and contained in a prescribed area within the rotor without the use of any conductive materials in the spaces (i.e., the open spaces in the laminated plates where the bridges have been removed) that will increase flux leakage.

The proposed solution described herein consists of multiple laminated plates or laminations of electrical steel that comprise a stack forming a rotor core or a sub-stack of a rotor core. Dependent on the specific electric machine architecture, multiple sub-stacks may be required to form the rotor core.

A representative slice of the rotor core depicts a typical layout for a double-V magnet configuration where a set of large and small magnets form a V-shape near the outer diameter of the rotor. It is noted that some configurations may only comprise a single-V magnet configuration. Cutouts in the lamination create a space (e.g., pockets) for which the magnets occupy. A void is present where the outer bridges would normally occupy as they have been eliminated to reduce the flux leakage around the magnets. In the center of the V-shape, electrically insulating inserts, connectors, or couplers are situated. The inserts, connectors, or couplers may form a dovetail to secured separated sections of the laminated plates or laminations to each other. The purpose of the inserts is to support the centrifugal loading on the rotor core during the electric machine's operation without conducting flux, providing a leakage path. Despite each sub-stack being comprised of multiple laminated plates or laminations, the magnets and inserts may be solid bodies that span the entire height of a sub-stack (or multiple sub-stacks with a no-skew rotor).

Opposite to the inserts on the other ends of the magnets are deformable gaskets. The gaskets may be the full height of the sub-stack and wedge between the magnet and undercuts in the magnet pockets. The compressed gasket seals the magnet pocket, allowing for the molding compound (e.g., resin or epoxy) to be injected. Flat, C-shaped, or alternative configuration gaskets may be used to seal the pocket. C-shaped and U-shaped gaskets also provide the benefit of centering each magnet within a corresponding pocket defined by the laminated plates or laminations. The molding compound envelops the magnets and inserts, filling the voids in the magnet pockets and the voids around the inserts where the bridges between pairs of pockets have been removed. The molding compound is contained by the gaskets at both ends.

The solution described herein accomplishes a full elimination of the center bridges and outer bridges (i.e., the bridges between pairs of magnets and the bridges between each magnet and the outer peripheries of the laminated plates or laminations) while also utilizing a molding compound (e.g., an epoxy or resin). Utilizing a molding compound to fix the magnets to the laminated plates or laminations increases thermal conductance and provides a structural load path through the magnets as opposed to alternative magnet fixation methods.

The solution described herein allows for retaining the molding compound without the use of electrically conducting materials. The implementation of a deformable gasket creates a seal when the molding compound is injected under pressure, providing the containment of the modeling compound. When a non-conducting insert (e.g., a dovetail shaped insert, connector, or coupler) is used in the center bridge location to support the loading on the rotor during operation and when non-conducting gaskets are used in place of the traditional outer bridges, there are no conducting leakage paths for which flux loss around the magnets could occur. The proposed solution thus allows for a notable reduction in magnet utilization for a given performance specification, enhancing pricing metrics and reducing the dependency on heavy rare earth elements.

Extending beyond the primary objective of the solution described herein, the proposal has the ancillary benefits of being compatible with alternative magnet configurations, has the ability to be diverse in the material selection, and can be utilized when a center bridge (e.g., a bridge within the laminated plates or laminations that extends between lower ends of pockets within a pair of pockets that receive the magnets) is present and when only the outer bridges (e.g., the bridges within the laminated plates or laminations that extend between the upper ends of pockets that receive the magnets and an outer periphery of the laminated plates or laminations) have been eliminated. Thus, the flexibility of the solution described herein demonstrates a large degree of utilization when implementing use of a molding compound while simultaneously eliminating the bridges within the laminated plates or laminations.

Figure 2:
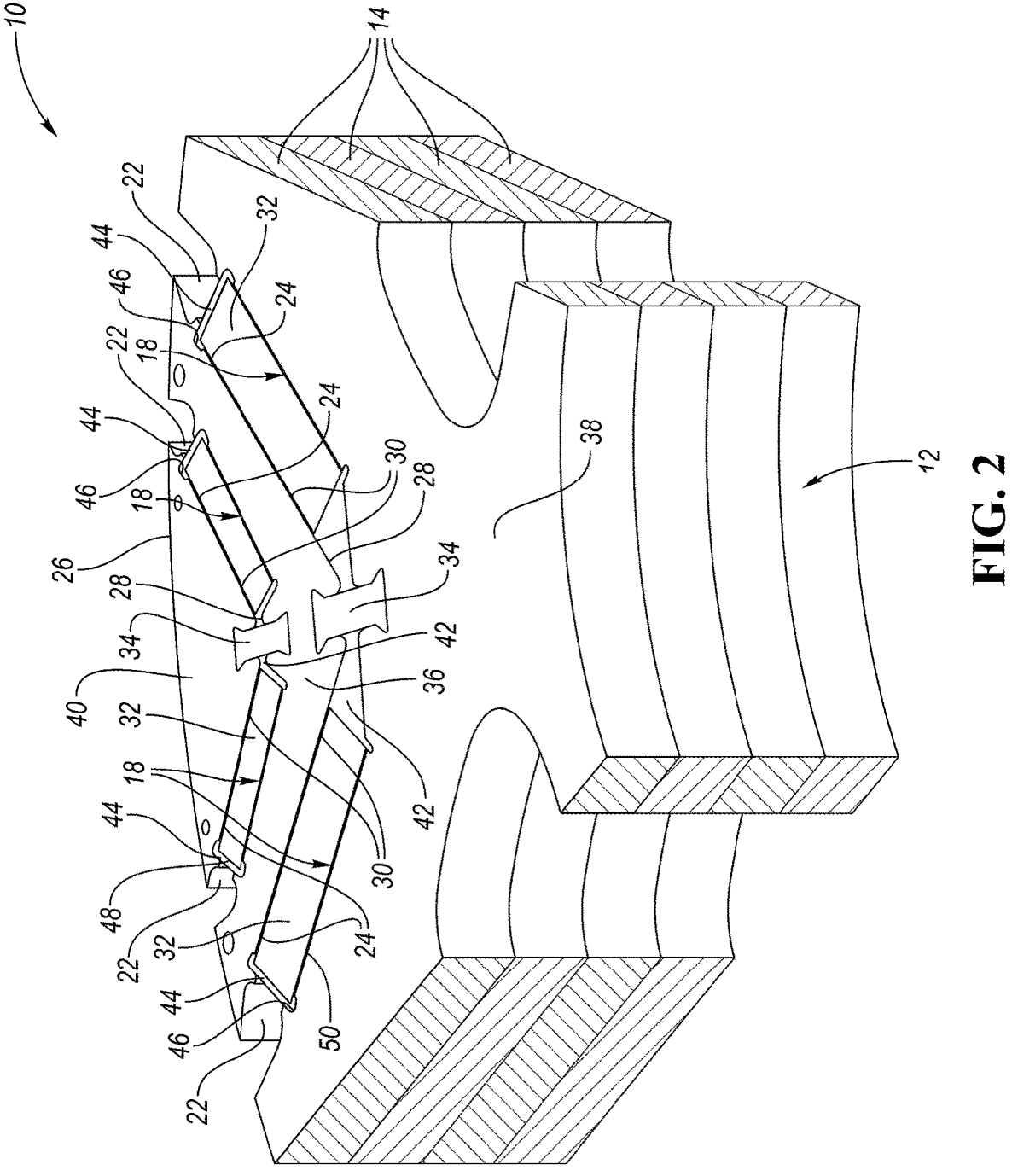
FIG. 2 is an isometric view of a section of the rotor comprising area A from FIG. 1.
Figure 3:
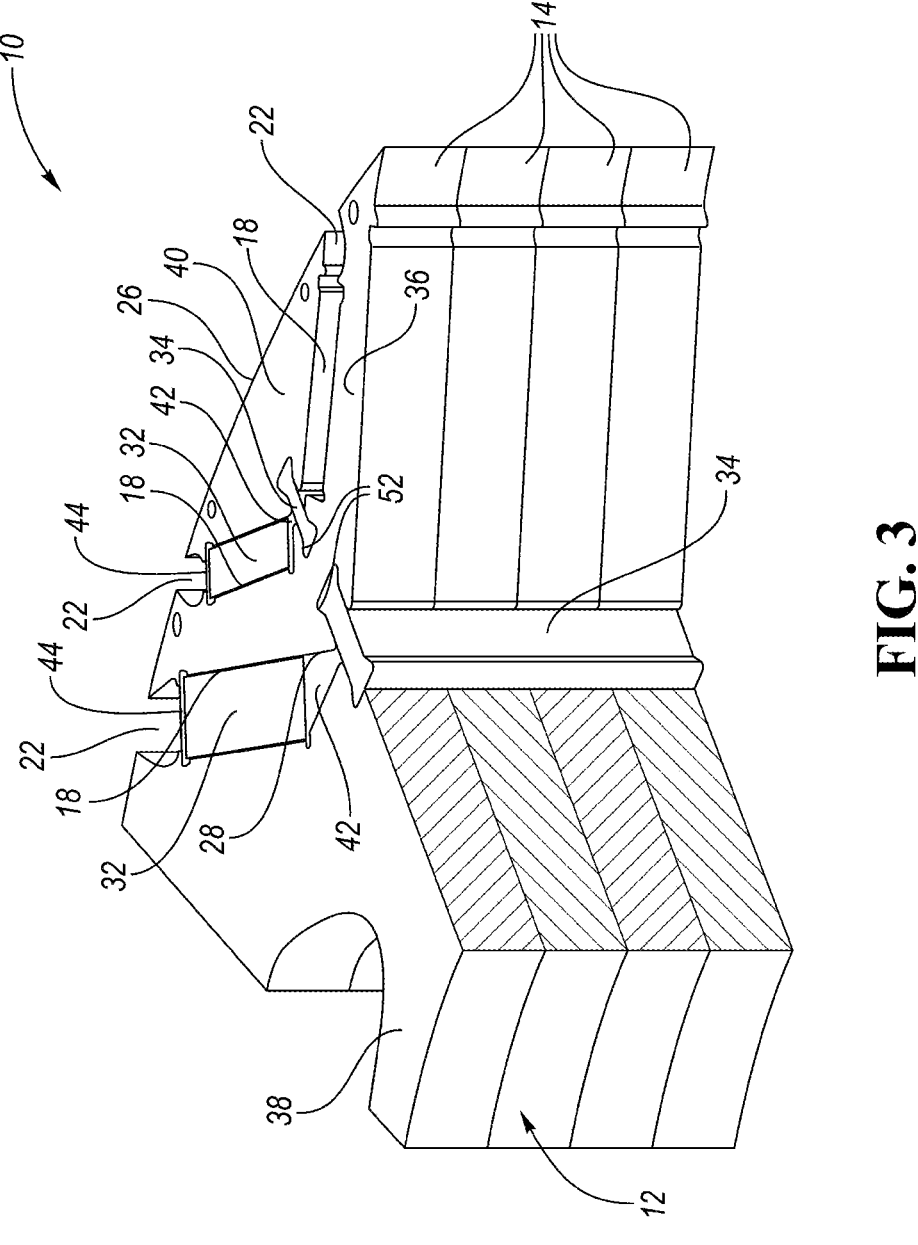
FIG. 3 is an isometric view of a section of the rotor comprising area B from FIG. 1.

Referring to FIGS. 1-3, a rotor 10 for an electric machine is illustrated. The rotor 10 includes a core 12 formed by a plurality of stacked plates 14. The plates 14 may be referred to as a plurality of laminations or laminated plates that are sequentially stacked in an axial direction along an axis of rotation 16 of the rotor 10 of the electric machine. The laminations are individually fabricated from a material such iron or steel (e.g., electrical steel). The laminations are then aligned in an axial direction (i.e., along the axis of rotation 16 of the rotor 10) to form the rotor 10 of the electric machine. The laminations may be stacked "loose", welded, or bonded together depending the desired application. The laminations may include a thin layer of insulating material (e.g., a thin layer of epoxy or resin that is approximately 0.001 mm thick). There may or may not be small spaces between adjacent laminations at locations where the adjacent laminations are not affixed to each other, if the application requires the adjacent laminations to be affixed to each other (i.e., via welding or bonding).

The core 12, or more specifically the plates 14, may define pockets 18 that are arranged in V-shaped pairs. The V-shaped pairs may be arranged in one or more sets of pockets 18 that each form a pole of the rotor 10. In the illustrated example, each pole has two V-shaped pairs of pockets 18 that are aligned on a common D-axis 20. However, it should be understood that each pole may define any number of V-shaped pairs of pockets 18. The core 12, or more specifically the plates 14, may also define notches 22 extending from outer ends 24 of each pocket 18 to outer peripheries 26 of the plates 14. The core 12, or more specifically the plates 14, may also define bridging cavities 28 extending between and connecting inner ends 30 of each pocket 18 within each of the V-shaped pairs of pockets 18. The bridging cavities 28 may also be referred to as linking cavities or as cavities. The notches 22 correspond to spaces where the outer bridges of the plates 14 (i.e., the bridges between each pocket 18 and the outer peripheries of the plates 14) have been removed while the bridging cavities 28 correspond to spaces where the inner bridges of the plates 14 (i.e., the bridges between each pocket 18 within the V-shaped pairs of pockets 18) have been removed.

Magnets 32 are disposed within each of the pockets 18. Insert, connectors, or couplers 34 are disposed within each of the bridging cavities 28. The couplers 34 secure outer portions 36 of each plate 14 to a base portion 38 of each plate 14. Each outer portion 36 of each plate 14 is separated from a corresponding base portion 38 of each plate 14 by an opening collectively formed by one of the V-shaped pairs of pockets 18, two of the notches 22, and one of the bridging cavities 28. In the event that each pole has more than one V-shaped pairs of pockets 18, additional outer portions 40 of each plate 14 may be connected to the base portion 38 of each plate indirectly through one of the outer portions 36. In such an alternative, the outer portions 36 may be referred to as intermediate portions.

A molding compound 42 is disposed within each pocket 18 and each bridging cavity 28. The molding compound 42 may be an epoxy or resin that fixes the magnets 32 to the plates 14, increases thermal conductance, and provides a structural load path through the magnets 32. The molding compound 42 encases each magnet 32 and each coupler 34. The molding compound 42 also secures each magnet 32 and each coupler 34 to at least one of the plates 14.

Gaskets 44 are disposed along outer ends 24 of each pocket 18. Stated in other terms, each gasket 44 may be disposed between one of the pockets 18 and one of the notches 22. The gaskets 44 are configured to retain the molding compound 42 within the pockets 18 and the bridging cavities 28. The gaskets 44 are also configured to isolate the molding compound 42 from the notches 22. Stated in other terms, the gaskets 44 are configured to prevent the molding compound 42 from spilling out of the pockets 18 and into the notches 22, particularly during manufacturing while the molding compound 42 is still in a liquid form before curing into a solid. The plates 14 define undercuts or slots 46 configured to receive the gaskets 44. Each slot 46 may be defined between an outer end 24 of one of the pockets 18 and one of the notches 22.

Figure 4:
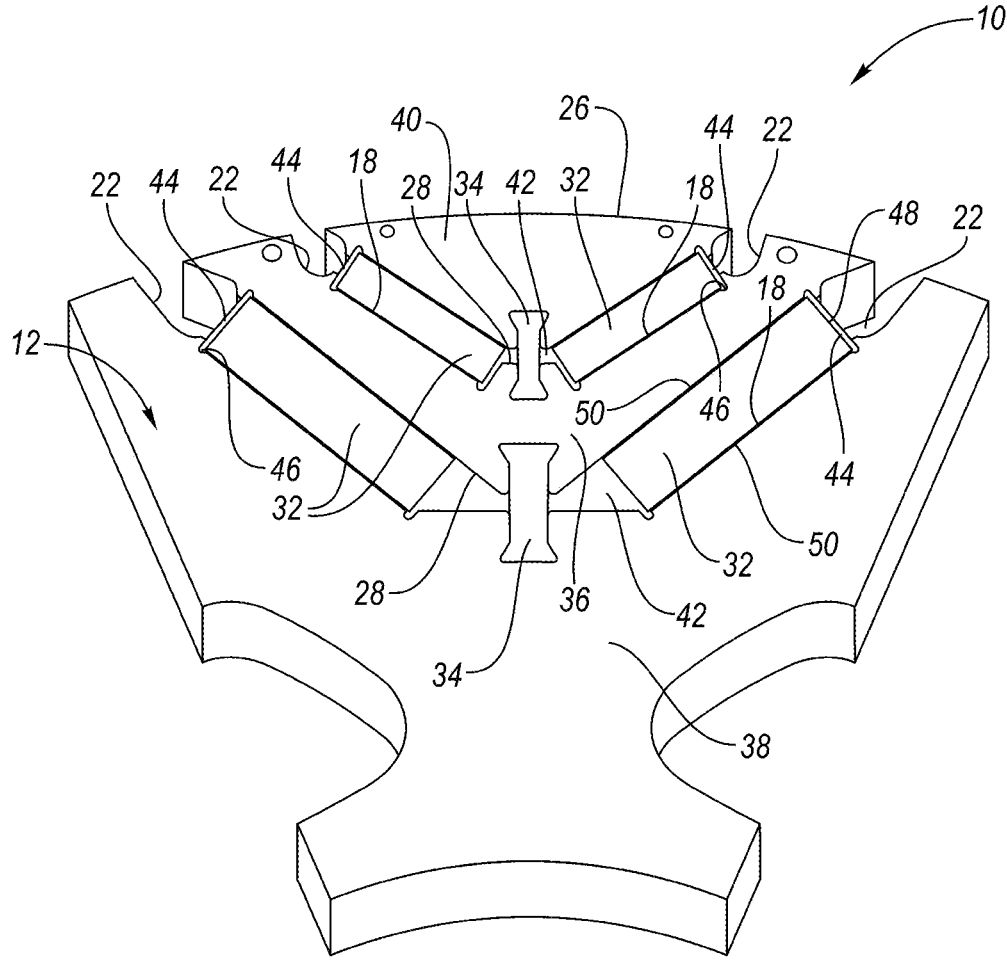
FIG. 4 is an alternative configuration of the rotor comprising a section similar to the section of the rotor illustrated in FIG. 2.

The gaskets 44 may have one several configurations. For example, the gaskets 44 may have C-shaped or U-shaped cross-sections (e.g., see FIGS. 1-3) engage the outer ends 48 and lateral sides 50 of the magnets 32, which operates to center the magnets 32 in a corresponding pocket 18. As another example, the gaskets 44 may have flat cross-sections (e.g., see FIG. 4) that only engage the outer ends 48 of the magnets 32.

The couplers 34 may be dovetailed in shape. The couplers 34 may engage corresponding dovetailed notches 52 defined by the outer portions 36 and base portion 38 of each plate 14 to secure the outer portions 36 to a corresponding base portion 38. The couplers 34, the gaskets 44, and the molding compound may all be made from an electrically non-conductive material to reduce the flux leakage around the magnets 32. For example, the molding compound 42 may be made from a non-conductive epoxy or resin. The couplers 34 may be made from a non-conductive material that provides structural support such as hard or rigid plastic. The gaskets 44 may be made from a non-conductive material that also provides the requisite sealing properties to prevent the molding compound from flowing into the notches 22 during manufacturing. For example, the gaskets may be made from a rubber or soft plastic material that has sufficient elasticity to fill any existing gaps where the molding compound could flow from the pockets 18 and into the notches 22 during manufacturing.

Figures 5, 6:
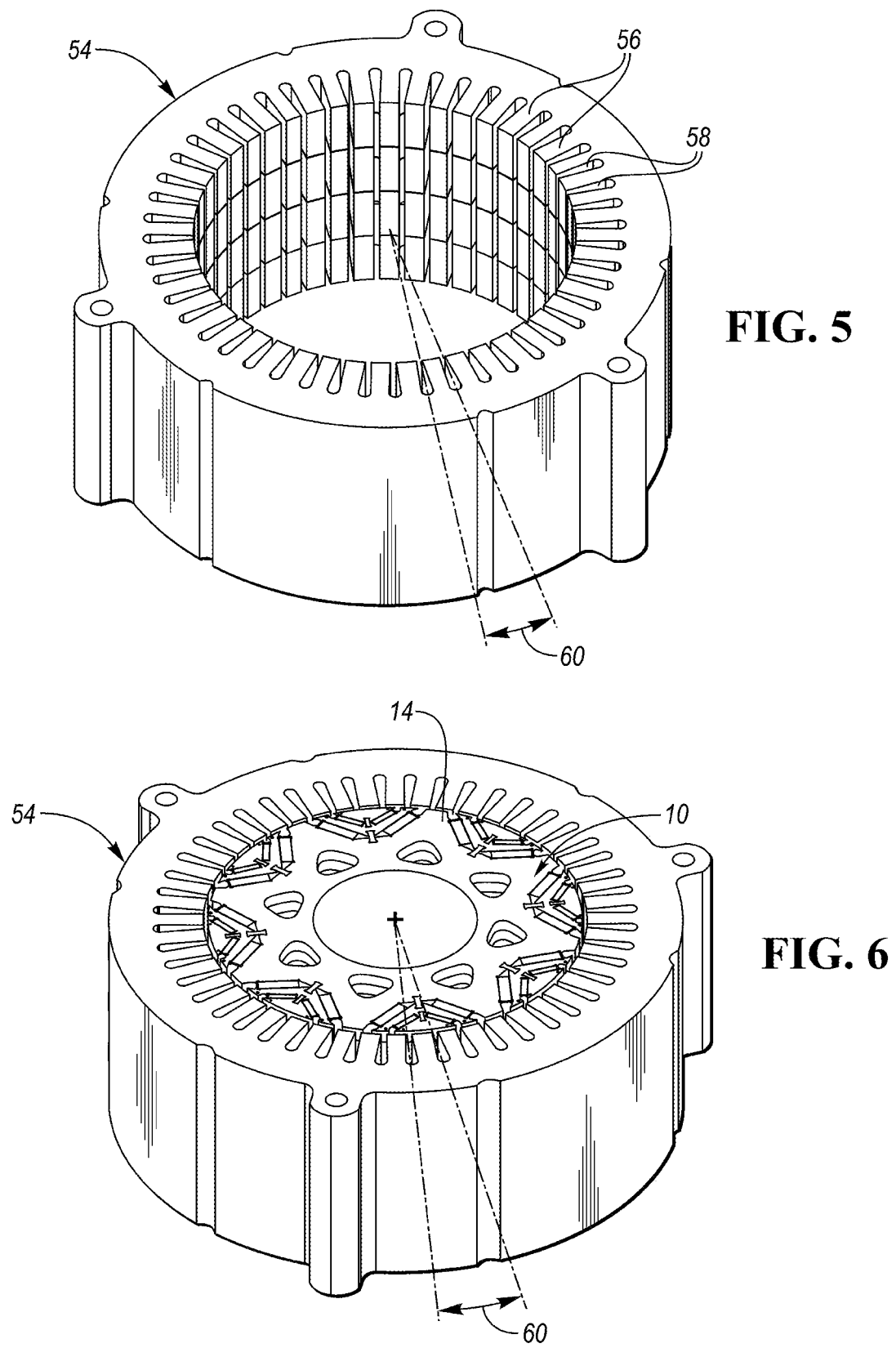
FIG. 5 is a perspective view of a stator.
FIG. 6 is a perspective view of an electric machine having a stator and a rotor.

Now referring to FIGS. 5 and 6, a stator 54 is shown. The stator 54 has teeth 56 and stator winding cavities or slots 58 to support a set of stator windings. The stator 54 may surround a rotor 10 having a plurality of rotor sections from any of the embodiments described herein having permanent magnet pockets arranged therein. Some of the sections are not shown. The difference between a pole arc angle may be equal to the slot pitch 60 of the stator. The slot pitch 60 is the mechanical angle between adjacent slots arranged around the entire stator 54. For example, a 48-slot stator 54 has a slot pitch 60 of 7.5 degrees. The difference between the pole arc angles may be equal to the slot pitch 60 of the stator 54.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. An electric machine rotor comprising:
a plurality of plates stacked along an axis, each of the plates defining
pairs of pockets,
notches extending from outer ends of each pocket to outer peripheries of the plates, and
bridging cavities extending between and connecting inner ends of each pocket within each of the pairs of pockets;
magnets disposed within each of the pockets;
couplers disposed within each of the bridging cavities, and securing outer portions of each plate to a base portion of each plate, wherein each outer portion of each plate is separated from the base portion of each plate by an opening collectively formed by one of the pairs of pockets, two of the notches, and one of the bridging cavities, and wherein the couplers are dovetailed and engage corresponding dovetailed notches defined by the outer portions and base portion of each plate to secure the outer portions to a corresponding base portion:
a molding compound d within each pocket and each bridging cavity, wherein the molding compound (i) encases each magnet and each coupler and (ii) secures each magnet and each coupler to at least one of the plates; and
gaskets each disposed along an outer end of each pocket, wherein the gaskets are configured to (i) retain the molding compound within the pockets and the bridging cavities and (ii) isolate the molding compound from the notches.
2. The electric machine rotor of claim 1, wherein each of the plates defines slots configured to receive the gaskets.

3. The electric machine rotor of claim 2, wherein the slots are defined between the outer ends of each pocket and a corresponding notch.

4. The electric machine rotor of claim 1, wherein the gaskets have flat cross-sections that engage outer ends of the magnets.

5. The electric machine rotor of claim 1, wherein the gaskets have C-shaped cross-sections that engage outer ends and lateral sides of the magnets.

6. The electric machine rotor of claim 1, wherein the gaskets have U-shaped cross-sections that engage outer ends and lateral sides of the magnets.

7. The electric machine rotor of claim 1, wherein the couplers and molding compound are comprised of an electrically non-conductive material.

8. An electric machine rotor comprising:

a core defining (i) pockets, (ii) notches extending from outer ends of each pocket, and (iii) cavities each extending between inner ends of and connecting two of the pockets;

magnets disposed within each of the pockets, a resin disposed v in each pocket and each cavity, wherein the resin (i) encases each magnet and (ii) secures each magnet to the core; and gaskets each disposed along an outer end of each pocket, wherein the gaskets are configured to (i) retain the resin within the pockets and the cavities and (ii) isolate the resin from the notches, wherein the gaskets have cross-sections that engage outer ends and lateral sides of the magnets.

9. The electric machine rotor of claim 8 further comprising couplers disposed within each of the cavities and securing outer portions of the core to a base portion of the core, wherein each outer portion is separated from the base portion by an opening collectively formed by two of the pockets, two of the notches, and one of the cavities.

10. The electric machine rotor of claim 8, wherein the core defines slots configured to receive the gaskets.

11. The electric machine rotor of claim 10, wherein the slots are defined between the outer ends of each pocket and a corresponding notch.

12. The electric machine rotor of claim 8, wherein the gaskets have flat cross-sections that engage outer ends of the magnets.

13. The electric machine rotor of claim 8, wherein the resin is comprised of an electrically non-conductive material.

14. An electric machine rotor comprising:

stacked plates defining (i) pockets, (ii) notches extending from outer ends of each pocket to outer peripheries of the plates, and (iii) linking cavities each extending between inner ends of and connecting two of the pockets:

magnets disposed within each of the pockets;

connectors disposed within each of the linking cavities and securing outer portions of the plates to base portions of the plates a resin disposed within each pocket and each cavity, wherein the resin (i) encases each magnet and connector and (i) secures each magnet and connector to at least one of the plates; and gaskets each disposed between one of the pockets and one of the notches, wherein the gaskets are configured to (i) retain the resin within the pockets and the cavities and (ii) isolate the resin from the notches, wherein the plates define slots configured to receive the gaskets.

15. The electric machine rotor of claim 14, wherein the gaskets have flat cross-sections that engage outer ends of the magnets.

16. The electric machine rotor of claim 14, wherein the gaskets have cross-sections that engage outer ends and lateral sides of the magnets.

17. The electric machine rotor of claim 14, wherein the connectors and the resin are comprised of an electrically non-conductive material.

18. The electric machine rotor of claim 9, wherein the couplers are dovetailed.

19. The electric machine rotor of claim 14, wherein the gaskets have C-shaped cross-sections that engage outer ends and lateral sides of the magnets.

20. The electric machine rotor of claim 14, wherein the gaskets have U-shaped cross-sections that engage outer ends and lateral sides of the magnets.

\* \* \* \* \*